US00RE44100E

(19) United States
(12) Reissued Patent
Cannata

(10) Patent Number: US RE44,100 E
(45) Date of Reissued Patent: Mar. 26, 2013

(54) REGENERATIVE BRAKE SYSTEM AND HYDRAULIC PUMP/MOTOR FOR USE THEREIN

(75) Inventor: Antonio Cannata, London (CA)

(73) Assignee: Tonand Brakes, Inc., London, Ontario (CA)

(21) Appl. No.: 13/324,570

(22) Filed: Dec. 13, 2011

Related U.S. Patent Documents

Reissue of:
(64) Patent No.: 7,828,395
Issued: Nov. 9, 2010
Appl. No.: 11/626,497
Filed: Jan. 24, 2007

U.S. Applications:
(62) Division of application No. 13/218,995, filed on Aug. 26, 2011.

(51) Int. Cl.
*B60T 8/40* (2006.01)
(52) U.S. Cl. ..... 303/152; 303/116.4; 303/10
(58) Field of Classification Search ..... 303/10, 303/11, 116.4, 152; 417/250, 470, 529
See application file for complete search history.

(56) References Cited

U.S. PATENT DOCUMENTS

| | | | | | |
|---|---|---|---|---|---|
| 3,113,491 | A * | 12/1963 | Borowka | 92/158 |
| 3,417,702 | A | 12/1968 | Behm | |
| 3,840,087 | A * | 10/1974 | Von Loewis et al. | 180/271 |
| 3,905,281 | A * | 9/1975 | Clerk | 92/143 |
| 4,715,666 | A * | 12/1987 | Farr | 303/116.4 |
| 4,781,104 | A | 11/1988 | Kita | |
| 5,383,718 | A * | 1/1995 | Burgdorf et al. | 303/113.2 |
| 5,496,099 | A * | 3/1996 | Resch | 303/114.1 |
| 5,529,466 | A * | 6/1996 | Tackett | 417/529 |
| 5,558,413 | A * | 9/1996 | Resch | 303/115.3 |
| 5,915,927 | A * | 6/1999 | Kuromitsu | 417/250 |
| 2008/0084108 | A1 * | 4/2008 | Crimpita | 303/87 |
| 2008/0100129 | A1 * | 5/2008 | Lubbers | 303/113.1 |
| 2010/0044129 | A1 * | 2/2010 | Kyle | 180/65.25 |

FOREIGN PATENT DOCUMENTS

| | | |
|---|---|---|
| WO | 2005/079461 A2 | 9/2005 |
| WO | 2006/091541 A2 | 8/2006 |

* cited by examiner

*Primary Examiner* — Christopher Schwartz
(74) *Attorney, Agent, or Firm* — Occhiuti Rohlicek & Tsao LLP

(57) ABSTRACT

A regenerative brake system and a variable displacement pump/motor for use therein. Each cylinder of the pump/motor having a main piston and a second piston between which is defined a space for hydraulic fluid, and a resilient element acting on the second piston to bias it toward the main piston. Variable displacement is achieved by controlling a volume of pressurized fluid that is injected and exhausted between the main and second pistons. Brake, drive and neutral modes of operation of the pump/motor are achieved by controlling the timing (relative to a drive shaft phase) of the injection and exhaust of the fluid. Regeneration is achieved by storing pressurized fluid generated by the pump/motor in an accumulator in brake mode and using the stored pressurized fluid to power the pump/motor in drive mode.

16 Claims, 7 Drawing Sheets

AMENDED

AMENDED

Mode: Braking
Direction: Reverse

Mode: Braking
Direction: Forward

Mode: Neutral
Direction: Either

Mode: Drive
Direction: Reverse

Mode: Drive
Direction: Reverse

REGENERATIVE BRAKE SYSTEM AND HYDRAULIC PUMP/MOTOR FOR USE THEREIN

Matter enclosed in heavy brackets [ ] appears in the original patent but forms no part of this reissue specification; matter printed in italics indicates the additions made by reissue.

*CROSS REFERENCE TO RELATED APPLICATIONS*

*This application is a divisional application, under 35 USC 120, of U.S. application Ser. No. 13/218,995, filed on Aug. 26, 2011, which is a reissue of U.S. application Ser. No. 11/626,497, filed Jan. 24, 2007 (now U.S. Pat. No. 7,828,395), the contents of all prior applications are considered part of, and are incorporated by reference in, the disclosure of this application. More than one reissue application has been filed for reissue of U.S. Pat. No. 7,828,395. The reissue applications are the present application and U.S. application Ser. No. 13/218,995, filed on Aug. 26, 2011.*

*Notice: More than one re-issue application has been filed for the re-issue of U.S. Pat. No. 7,828,395. The re-issue applications are U.S. application Ser. No. 13/218,995, filed on Aug. 26, 2011, and U.S. application Ser. No. 13/324,570 (the present application), filed on Dec. 13, 2011, which is a divisional of U.S. application Ser. No. 13/218,995.*

FIELD OF INVENTION

The present invention relates to the fields of hydrostatic pump/motors and regenerative brake systems. In particular, to a regenerative brake system and hydraulic pump/motor for use therein.

BACKGROUND

Concerns about the cost of operating and the environmental impact of motorized vehicles has generated heightened interest in regenerative brake systems. Typically regenerative brake systems capture and store some or all of the energy that would otherwise be dissipated as heat by a friction based braking system during deceleration of the vehicle. The stored energy can be used to accelerate the vehicle either alone or in combination with another energy source such as an engine. Vehicles equipped with a regenerative brake system and another source of motive power (e.g. an engine or motor) are often referred to as hybrid vehicles.

Many alternative implementations of hybrid vehicles have been developed using various types of regenerative brake systems; electric and hydraulic regenerative brake systems being commonly used. One aspect that many of the different hybrid vehicle implementations share is complexity. A typical hybrid vehicle can include an internal combustion engine, a mechanical transmission, an electric motor/generator, a planetary gearbox, a bank of batteries, an alternating current/direct concurrent (AC/DC) converter, a hydraulic operated friction brake system, and at least one control module to control and coordinate the operation of the other components.

Some of the complexity of a hybrid vehicle implementation can be reduced through the use of a hydrostatic brake system where one or more hydraulic pump/motors each acting on one or more axles of the vehicle are used as the primary brake system and also as the regenerative drive element. Typically the hydraulic pump/motor includes a reciprocating piston or a rotating rotor whose speed of reciprocation or rotation is a function of the speed of rotation of the vehicle axle. The power (braking and drive) transferred by the hydraulic pump/motor is a function of the flow (i.e. volume/time) and pressure of hydraulic fluid displaced through the pump/motor. In order for the pump/motor to transfer sufficient power at low rotational speeds of the axle (i.e. low shaft speeds of the pump/motor) a relatively large displacement is required by the pump/motor. At higher vehicle speeds (i.e. higher shaft speeds), the large displacement becomes problematic as it necessitates the movement of large flows of hydraulic fluid resulting in the need for a large and costly hydraulic infrastructure What is needed is a less complex implementation of a hybrid vehicle and a hydraulic pump/motor for use therein that mitigates the need for moving large flows of hydraulic fluid at high vehicle speeds.

SUMMARY OF INVENTION

A regenerative brake system and a variable displacement pump/motor for use therein. Each cylinder of the pump/motor having a main piston and a second piston between which is defined a space for hydraulic fluid, and a resilient element acting on the second piston to bias it toward the main piston. Variable displacement is achieved by controlling a volume of pressurized fluid that is injected and exhausted between the main and second pistons. Brake, drive and neutral modes of operation of the pump/motor are achieved by controlling the timing (relative to a drive shaft phase) of the injection and exhaust of the fluid. Regeneration is achieved by storing pressurized fluid generated by the pump/motor in an accumulator in brake mode and using the stored pressurized fluid to power the pump/motor in drive mode.

In accordance with one aspect of the present invention, there is provided a regenerative brake system for use in a vehicle having at least one axle comprising: a variable displacement hydraulic pump/motor, connected for energy transfer to and from the axle; a hydraulic pressure accumulator for storing and supplying pressurized fluid; a proportioning valve for allowing pressurized fluid, above a release pressure threshold, generated in the pump/motor to enter the pressure accumulator; a fluid reservoir for receiving, storing and supplying pressure relieved fluid; an injection transformer for receiving a first volume of pressurized fluid at a first pressure from the pressure accumulator and supplying a second volume of pressurized fluid at a second pressure to the pump/motor, wherein the injection transformer can draw fluid from the fluid reservoir, the second volume is greater than the first volume and the second pressure is lower than the first pressure; a priming pump for drawing fluid from the fluid reservoir and supplying pressurized fluid to the pump/motor; a first control valve for controlling the injection of pressurized fluid from any of the pressure accumulator, the injection transformer and the priming pump into the pump/motor, wherein the displacement of the pump/motor is responsive to the volume of pressurized fluid injected; a second control valve for controlling the exhaust of pressurized fluid from the pump/motor to the reservoir; a first pressure relief valve connected to the pressure accumulator for supplying pressurized fluid at a reduced pressure; a second pressure relief valve connected to the pressure accumulator for relieving excess pressurized fluid in the pressure accumulator to the reservoir; a third control valve for controlling the flow of pressurized fluid from the accumulator, via the first pressure relief valve, to the injection transformer; a fourth control valve for controlling the flow of pressurized fluid from the accumulator to the pump/motor via the first pressure relief valve and the first control valve; and a control unit for controlling the operation of the regenerative brake system by controlling the release pressure threshold of the proportioning valve, and the timing and duration of the opening and closing of the first control valve, the second control valve, third control valve and the fourth control valve to achieve operation in each of a brake mode in which kinetic energy of the axle is converted to pressurized fluid exhausted by the pump/motor, a drive mode in which potential energy in pressurized fluid injected into the pump/motor is converted to kinetic energy in the axle, and a neutral mode in which substantially no net energy is transferred between the pump/motor and the axle.

Other aspects and features of the present invention will become apparent to those ordinarily skilled in the art or science to which it pertains upon review of the following description of specific embodiments of the invention in conjunction with the accompanying figures.

BRIEF DESCRIPTION OF DRAWINGS

The present invention will be described in conjunction with drawings in which.

DETAILED DESCRIPTION

Figure 1:
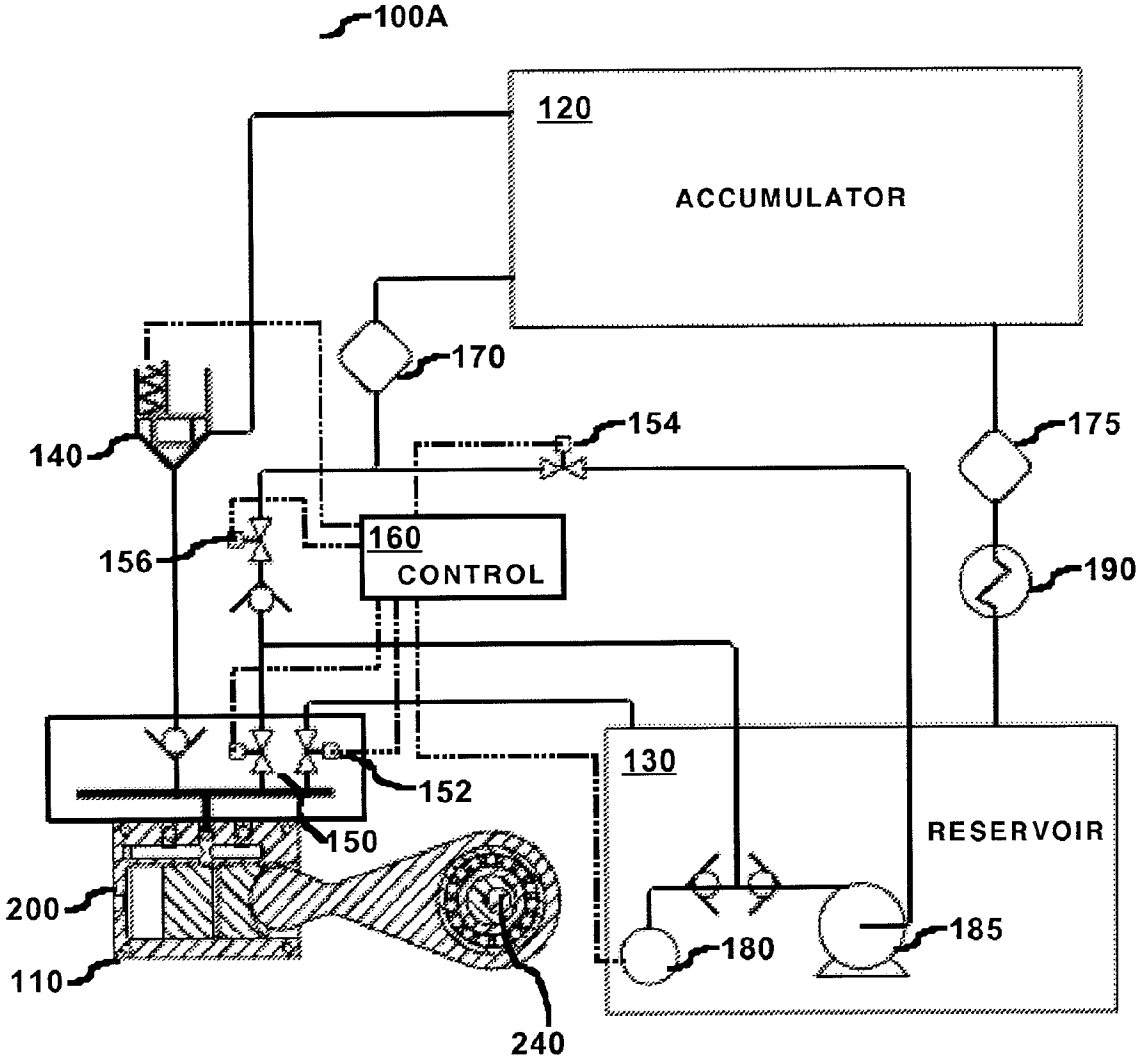
FIG. 1 is a schematic representation of an exemplary embodiment of a regenerative brake system.

FIG. 1 is a schematic representation of an exemplary embodiment of a regenerative brake system 100A in which hydraulic conduits are represented by solid lines and control signal paths are represented by dashed lines. The regenerative brake system 100A (hereinafter the brake system 100A) comprises a hydraulic pump/motor 110, a pressure accumulator 120, a hydraulic fluid reservoir 130, a proportioning valve 140, a first control valve 150, a second control valve 152, a third control valve 154, a fourth control valve 156, a first pressure regulator 170, a second pressure regulator 175, a control unit 160, a priming pump 180, an injection transformer 185, a heat exchanger 190 and a plurality of one-way valves (a.k.a. check valves) and hydraulic conduits interconnecting the other elements of the brake system 100A as will be described below.

The hydraulic pump/motor 110 comprises a cylinder unit 200 connected to a drive shaft 240. The drive shaft 240 can, for example, be an axle shaft connected to one or more wheels of a vehicle. When power is imparted to the drive shaft 240 the pump/motor 110 functions as a pump taking in hydraulic fluid at relatively lower pressure and putting out hydraulic fluid at a relatively higher pressure. When hydraulic fluid at a relatively higher pressure is input to the pump/motor 110 and output at relatively lower pressure, the pump/motor 110 functions as a motor and the drive shaft 240 is rotated. The pump/motor 110 can provide alternately a brake mode for decelerating the vehicle when functioning as a pump and a drive mode for accelerating or maintaining speed when functioning as a motor.

In the brake mode of operation the pump/motor 110 can supply to the pressure accumulator 120 pressurized fluid to be stored. A one-way valve allows fluid to flow from the pump/motor 110 to the accumulator 120, via the proportioning valve 140, and prevents flow in the opposite direction. The proportioning valve 140 is used to ensure that the pressure of the fluid being supplied from the pump/motor 110 to the accumulator 120 is at or above a pre-determined threshold. The proportioning valve 140 can be controlled by a control signal received from the control unit 160. In the brake mode of operation the control signal causes the proportioning valve 140 to remain closed (i.e. prevent through flow) until the pressure at an input port of the proportioning valve 140 reaches or exceeds an input pressure threshold at which point the proportioning valve 140 permits the flow of fluid from the input port to an output port (i.e. the valve opens to a varying degree) sufficient to keep the pressure at the input port substantially at the input pressure threshold (i.e. the degree to which the proportioning valve 140 opens is a function of the degree to which the input pressure exceeds the input pressure threshold). The proportioning valve 140 returns to a fully closed position when the input pressure abates below the input pressure threshold. The proportioning valve 140 can have a fixed or a variable input pressure threshold. The variable input pressure threshold of the proportioning valve 140 can be controlled by the control unit 160 using, for example, a variable voltage control signal. Excess fluid in the accumulator 120 can be released through the second pressure regulator 175 to the fluid reservoir 130 via the heat sink 190.

In the drive mode of operation the pump/motor 110 can receive pressurized fluid via the first control valve 150. The first control valve 150 is used to regulate the flow of fluid from the accumulator 120 to the pump/motor 110.

Figure 2:
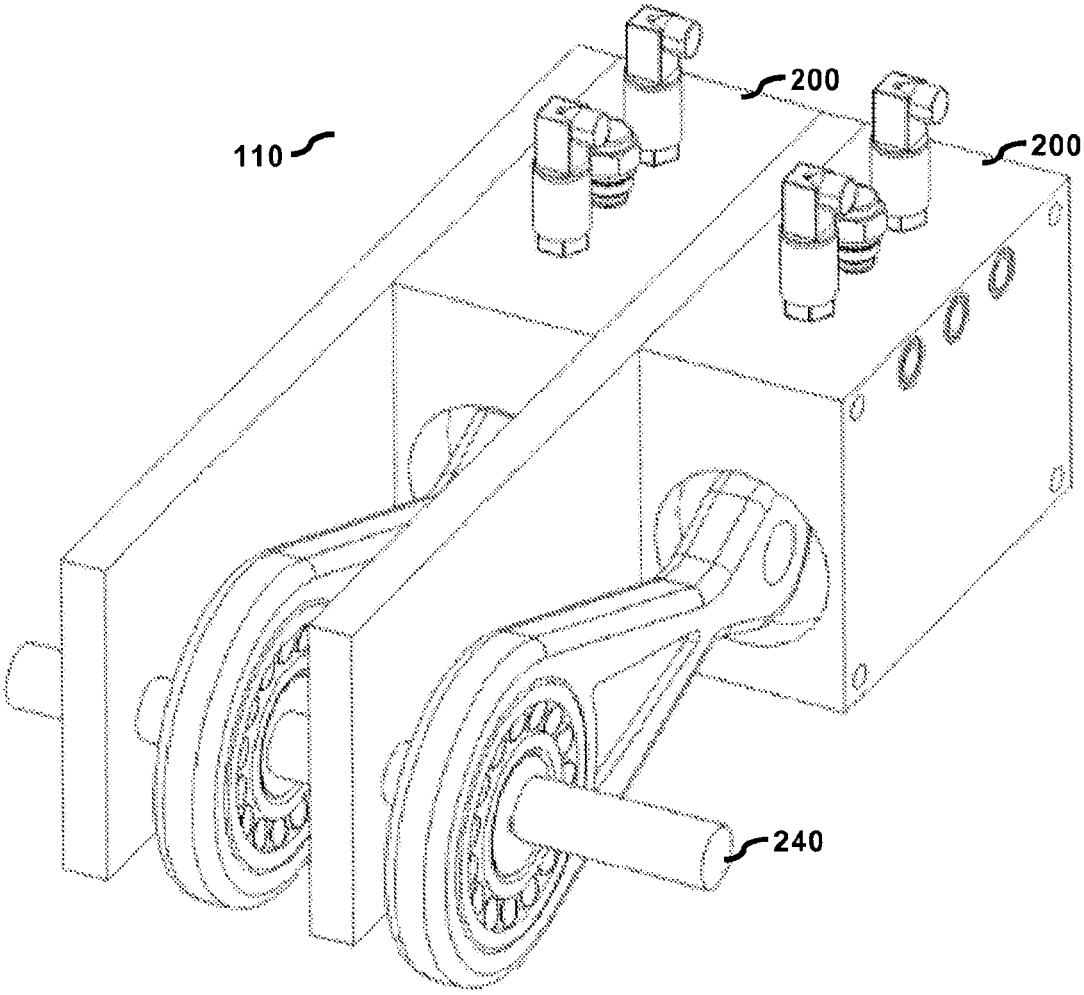
FIG. 2 is a perspective view of an exemplary embodiment of a two cylinder unit in-line pump/motor.
Figure 3:
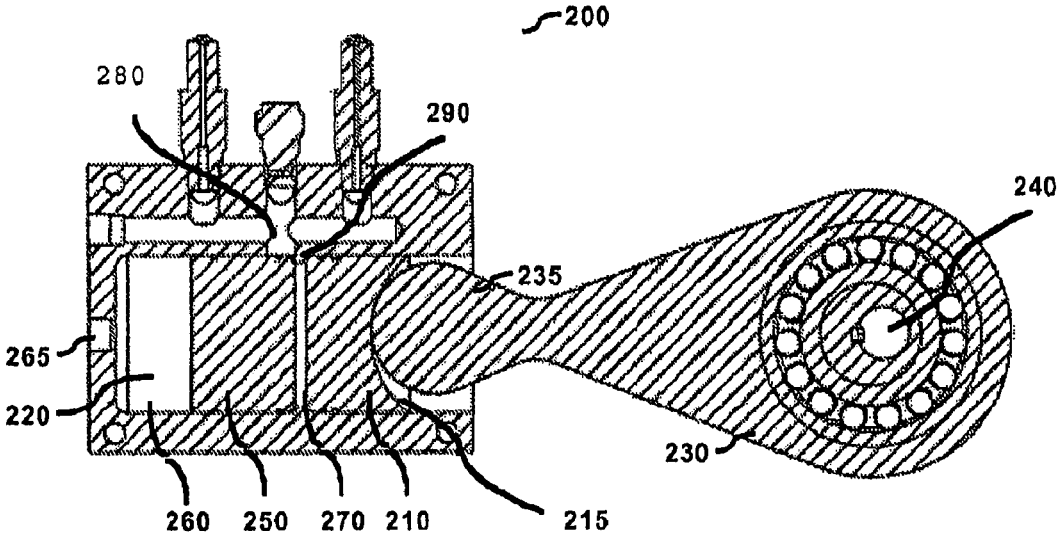
FIG. 3 is a cross-sectional side view of an exemplary cylinder unit.
Figure 4:
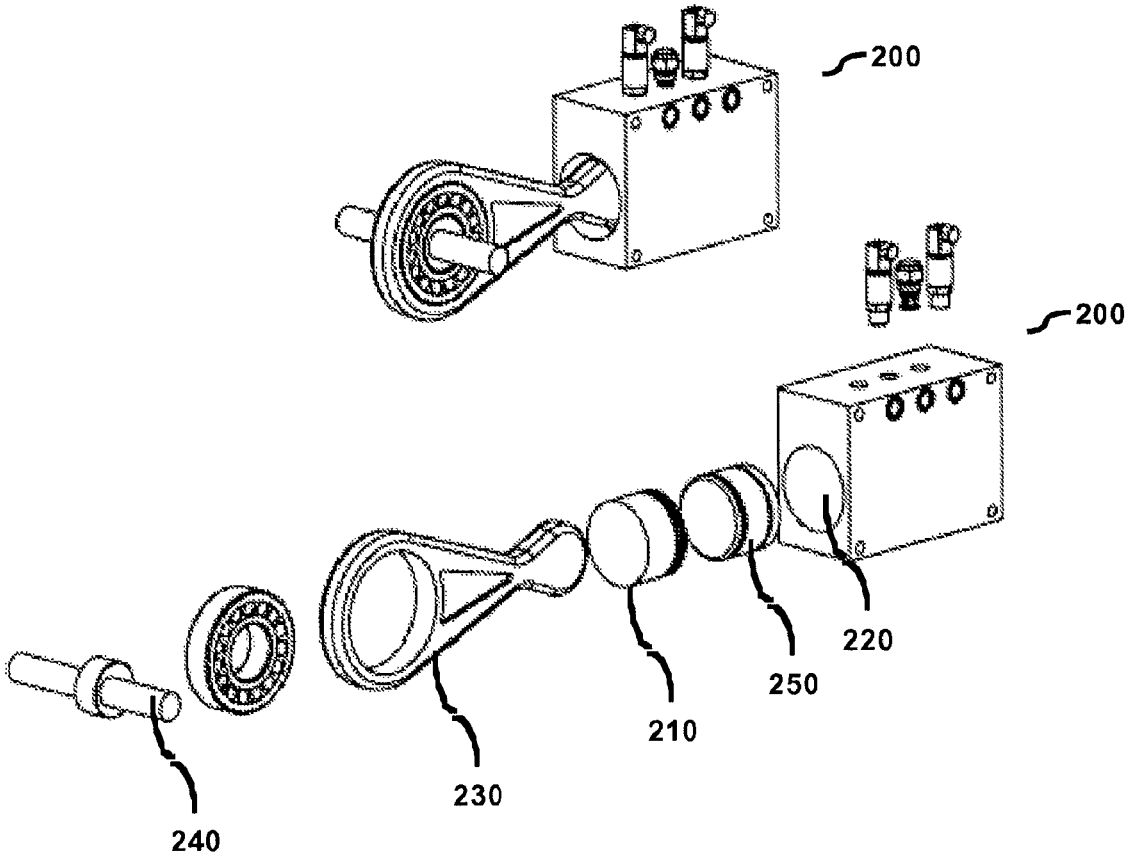
FIG. 4 is an exploded view of the exemplary cylinder unit of FIG. 3.
Figure 5A:
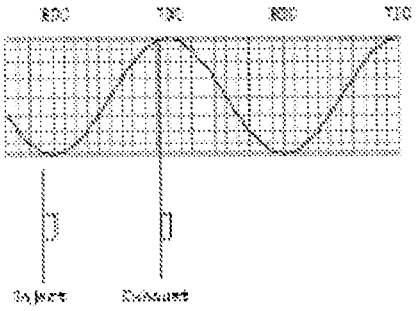
FIGS. 5A-E are schematic representations of exemplary fluid injection and exhaust timings relative to different modes of operation of the pump/motor.
Figure 5B:
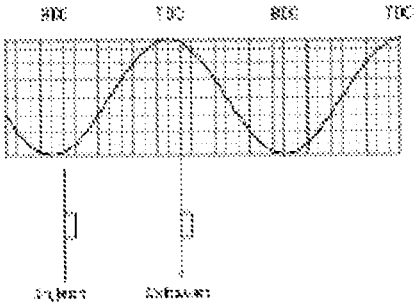
Figure 5C:
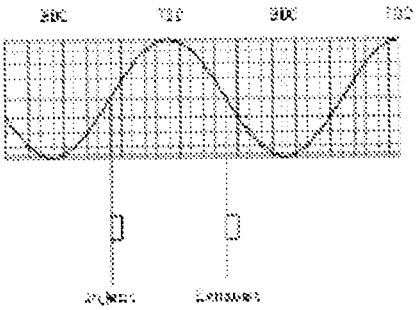
Figure 5D:
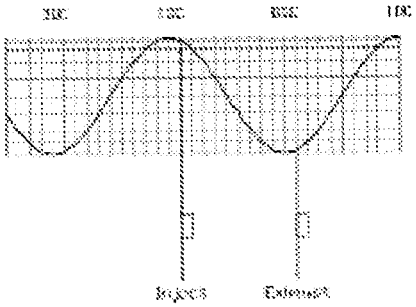
Figure 5E:
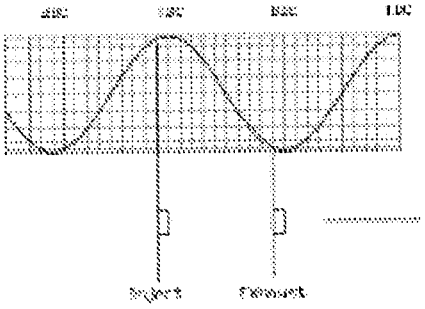

The pump/motor 110 illustrated in FIG. 1 comprises a single cylinder unit 200. In an alternative embodiment the pump/motor 110 can comprise one or more cylinder units 200, each connected to a common driveshaft 240, that can be arranged radially, in-line, opposed or in other well know configurations for cylinder units in pump/motors. FIG. 2 is an exemplary embodiment of a two-cylinder unit 200 in-line pump/motor 110. FIG. 3 is a cross-sectional side view and FIG. 4 is an exploded view of an exemplary single-cylinder unit 200 pump/motor 110. Each cylinder unit 200 includes a main piston 210 for reciprocation within a cylinder bore 220, a connecting rod 230 for connecting the main piston 210 to the driveshaft 240, a second piston 250 for reciprocation within the cylinder bore 220 and a resilient element 260 for acting on the second piston 250 and biasing it toward the main piston 210. The main piston 210 and the second piston 250 are arranged to define a volume 270 between them within the cylinder bore 220. The defined volume 270 can be filled with fluid that can enter and exit via a port 280 in the cylinder bore 220. The connecting rod 230 connects to the driveshaft 240 via an eccentric cam, offset journal or other similar well known mechanisms for converting rotational motion of the driveshaft 240 into reciprocating motion of the connecting rod 230. The connecting rod 230 includes a spherical end 235 that can bear against a correspondingly shaped bearing surface 215 on the underside of the main piston 210. Other well known bearing mechanisms that provide for the transfer of power between the connecting rod 230 and the main piston 210 and that allow for the main piston 210 to detach from (i.e.

decouple) from the connecting rod 230 can be used in an alternative embodiment. When in brake mode, rotational motion of the driveshaft 240 is transferred to reciprocating motion of the main piston 210 via the connecting rod 230. When in drive mode, reciprocating motion of the main piston 210 is transferred to rotational motion of the driveshaft 240. In a preferred embodiment a plurality of cylinder units 200 are arranged to operate in staggered, complementary phase with respect to the angle of rotation of the driveshaft 240 in order to reduce power pulsation on the driveshaft 240 and to mitigate slapping between the connecting rods 230 and the main pistons 210.

As the main piston 210 reciprocates between the extremes of its travel within the cylinder bore 220 (referred to as bottom dead center (BDC) and top dead center (TDC)) fluid enters and exists the volume 270 defined between the main piston 210 and the second piston 250. The volume of fluid that enters is substantially equal to the volume of the fluid that exits in one full cycle of reciprocation of the main piston 210. Power in the hydraulic pump/motor 110 is a function of the product of the flow of fluid (i.e. volume per unit time) and the pressure differential between the input and the output fluid. The relationship of power to the product of flow and pressure differential applies in both the brake mode and in the drive mode. In the brake mode power is supplied by the rotation of the drive shaft 240 and in the drive mode power is supplied by the pressurized flow of fluid into the cylinder.

The flow of fluid is a function of a product of the volume displaced (a.k.a. the displacement) within each cylinder as the main piston 210 reciprocates between BDC and TDC and the speed (i.e. frequency) of reciprocation. The shaft speed of the driveshaft 240 can be used in place of the speed of reciprocation for the purposes of calculating flow. In a conventional fixed displacement hydraulic pump/motor 110, power and flow are each linear functions of the shaft speed and therefore of the speed of the vehicle. This is an undesirable characteristic in particular for vehicles that have a wide range of operating speeds, such as, for examples automobiles. Setting the displacement high enough to ensure sufficient power at low vehicle speeds can result in relatively large capacity flows of fluid at higher vehicle speeds. Typically large flows of fluid require large configurations of many of the components in a hydraulic system, as well as resulting in significant levels of heat dissipation.

The pump/motor 110 of the present invention is a variable displacement pump providing for the operation of the pump/motor 110 at a relatively greater displacement at low shaft speeds and a relatively smaller displacement at high shaft speeds. Flow at high shaft speeds can therefore be reduced to mitigate the negative impact of large flows associated with fixed displacement pumps. Power requirements at higher shaft speeds can still be met because power is a function of the product of flow and speed. Therefore, a reduction in power as a result of decreasing the displacement, and thereby the flow, can be compensated for by the increased shaft speed.

Variable displacement is achieved by way of controlling the volume of fluid that enters (i.e. is injected into) the cylinder. The volume of fluid is controlled by the first control valve 150. The first control valve 150 is controlled by the control unit 160 that can regulate the duration and timing of open and closed modes of operation of the first control valve 150. In an alternative embodiment the control unit 160 can also control the flow rate (i.e. the degree of openness) of the first control valve 150. The pressurized fluid to be injected can originate from the priming pump 180, the injection transformer 185 or the accumulator 120. Operation of the injection transformer can be controlled by opening and closing the third control valve 154 that permits and blocks the flow of pressurized fluid from the accumulator 120, via the first pressure regulator 170, to the input of the injection transformer 185. The flow of pressurized fluid from the accumulator 120 to the pump/motor 110, via the first control valve 150, can be controlled by opening and closing the fourth control valve 156. The outputs of each of the priming pump 180, the injection transformer 185 and the fourth control valve 156 can be protected by a one-way valve that prevents flow into the output ports of each device. The control unit 160 determines which source of pressurized fluid to use and can control any of the priming pump 180, the injection the third control valve 154 and the forth control valve 156 accordingly.

The priming pump 180 can be used to supply pressurized fluid to the pump/motor 110 when the accumulator 120 does not contain sufficient pressurized fluid such as, for example, on initial system start-up when the accumulator 120 has not yet been charged with fluid or at any other time in the operation of the system when the accumulator 120 has been depleted of pressurized fluid. The priming pump 180 is an externally powered pump that draws fluid from the reservoir 130 and outputs pressurized fluid.

The injection transformer 185 can also be used to provide the fluid to be injected into the pump/motor 110. The injection transformer 185 receives a relatively smaller volume of relatively higher pressure fluid as input and provides a relatively larger volume of relatively lower pressure fluid as output. The input fluid is provided from accumulator 120 via pressure regulator 170 and the third control valve 154, therefore no external source of power (i.e. external to the brake system 100A) is required by the injection transformer 185. The injection transformer 185 draws fluid from the reservoir 130 to produce an output fluid stream. The injection transformer can be a rotary fluid device, a reciprocating fluid device, a Venturi-effect induction device, or any other well known form of pressure transformation device. The pressurized fluid preferably originates from the injection transformer 185 when there is sufficient pressurized fluid available in the accumulator 120.

When fluid enters the cylinder the main piston 210 is, in general, in contact with the connecting rod 230 and therefore the main piston 210 does not move in response to the entry of the fluid. Instead, the second piston 250 moves away from the main piston 210 and against the resistance of the resilient element 260. The pressure applied to the fluid must exceed the resistance of the resilient element 260 to the movement of the second piston 250 for the fluid to enter the cylinder. The fluid can be said to be injected into the cylinder and resilient element 260 can be said to be compressed.

The resilient element 260 can comprise a closed container of a compressible medium such as, for example, an air bag or a chamber charged with nitrogen. In an alternative embodiment the resilient element 260 can comprise a spring or other similar element that converts kinetic energy to potential energy and vice versa. In a further alternative embodiment, the resilient element 260 can be connected to an external resistance control element (not illustrated) such as, for example, a source of compressed air that can adjust the resistance of the resilient element 260 to the movement of the second piston 250. The source of compressed air (i.e. the resistance control element) can be connected to the resilient element 260 via, for example, a port 265 in the cylinder assembly 220. The resistance control element can also be connected to and interoperate with the control unit 160.

In the brake mode of operation fluid is injected into the cylinder shortly after the main piston 210 passes through the BDC and is moving toward the TDC position in the cylinder.

Figure 6A:
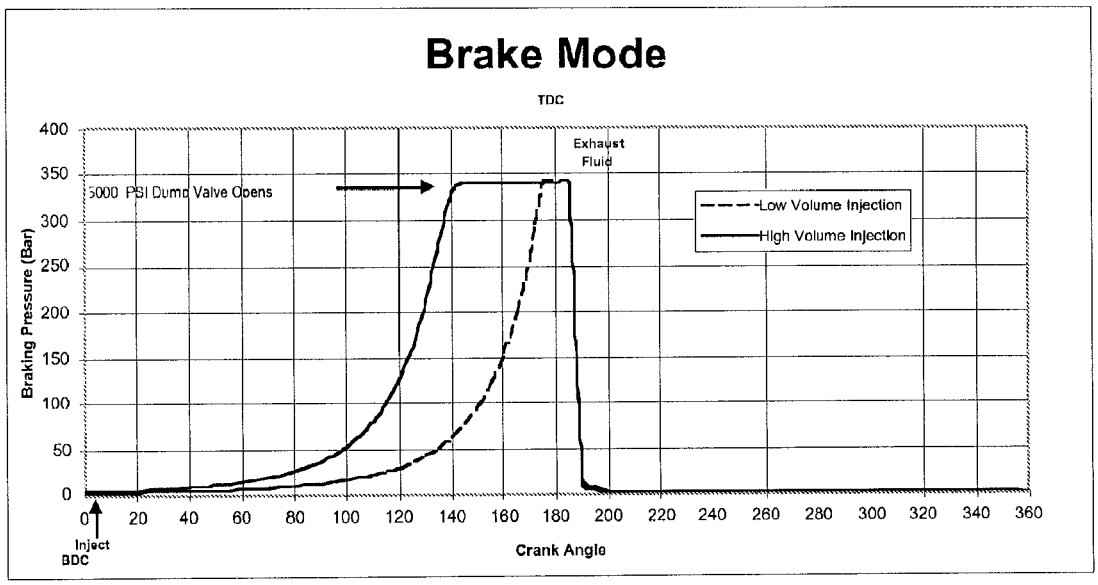
FIG. 6A-B are a graphical representations of the fluid pressure in the cylinder unit as function of driveshaft position for exemplary braking mode and drive mode scenarios respectively.

The second piston 250 also moves toward the TDC position as the fluid between the pistons is incompressible, the resilient element 260 is compressed and the fluid pressure in the cylinder rises. When the fluid pressure in the cylinder reaches or exceeds the input pressure threshold of the proportioning valve 140 fluid is released from the cylinder unit 200 into the accumulator 120. As the main piston 210 and the second piston 250 pass through the TDC position and begin to move toward the BDC position, the resilient element 260 can begin to decompress (i.e. to expand). The second control valve 152 can be opened to allow fluid from the cylinder to be released into reservoir 130 further allowing the resilient element 260 to expand. Kinetic energy from the drive shaft 240 is converted to potential energy as the resilient element 260 is compressed thereby providing braking power. The potential energy can be released without converting back to kinetic energy when the fluid is allowed to exit the cylinder either to the accumulator 120 or the reservoir 130. The fluid that enters the accumulator 120 increases the total potential energy stored in the accumulator 120. FIG. 6A is a graphical representation of the fluid pressure in the cylinder unit 200 as a function of driveshaft 240 position for two exemplary brake mode scenarios. The first scenario represents the injection of a relatively smaller volume of fluid and the second scenario represents the injection of a relatively larger volume of fluid. The braking power developed (i.e. absorbed from the driveshaft 240) by the cylinder unit is a function of the area under each curve. It can be observed from FIG. 6A that more braking power is developed by the relatively larger injection of fluid compared to the relatively smaller injection of fluid. The control unit 160 can regulate braking power by adjusting the volume of fluid injected into the cylinder unit 110.

When the capacity of the accumulator 120 is exceeded by fluid entering the accumulator 120, excess fluid can be released from the accumulator 120 into the storage reservoir 130. When fluid is released to the reservoir 130 it is allowed to depressurize to atmospheric pressure. The depressurization of the fluid can result in the release of potential energy in the form of heat. Fluid that is released from the accumulator 120 to the reservoir 130 preferably passes via the heat sink 190.

Figure 6B:
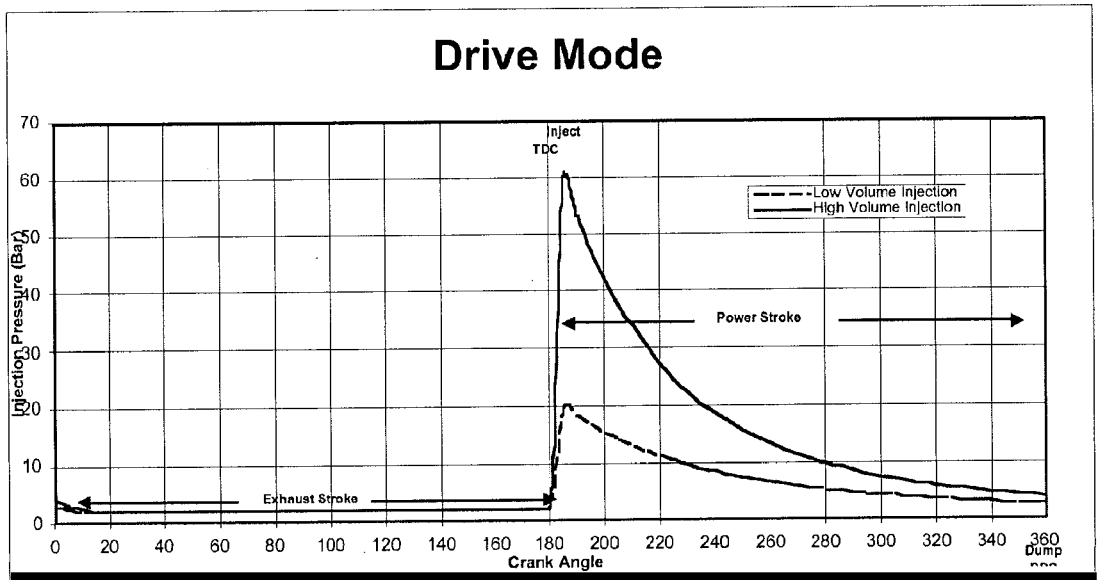

In the drive mode of operation fluid is injected into the cylinder as the main piston 210 approaches the TDC position in the cylinder and the second piston 250 also is moving toward the TDC position. As the fluid between the pistons is incompressible and the movement of the main piston 210 toward the BDC position is prevented, at this point, by movement of the connecting rod 230 and drive shaft 240, fluid that enters the cylinder will result in the resilient element 260 being compressed. The volume of fluid injected is controlled by the first control valve 150. The first control valve 150 is controlled by the control unit 160 that can regulate the duration and frequency of open and closed modes of operation of the first control valve 150. In an alternative embodiment the control unit 160 can also control the flow rate (i.e. the degree of openness) of the first control valve 150. The pressurized fluid to be injected can originate from the priming pump 180, the injection transformer 185 or the accumulator 120. The pressurized fluid preferably originates from the injection transformer 185 when there is sufficient pressurized fluid available in the accumulator 120. Regeneration occurs when pressurized fluid stored in the accumulator 120 during brake mode is used to supply the pump/motor 110 in drive mode. When no fluid is entering the cylinder and the main piston 210 and the second piston 250 move toward the BDC position, the resilient element 260 can begin to decompress (i.e. to expand). Potential energy stored in the resilient element 260 is converted to kinetic energy in the drive shaft 240 as the resilient element 260 is decompressed. As the main piston 210 passes through the BDC position, fluid in the cylinder is released into the reservoir 130 via the second control valve 152. The second control valve 152 is controlled by the control unit 160 that can regulate the duration and frequency of open and closed modes of operation of the second control valve 152. In an alternative embodiment the control unit 160 can also control the flow rate (i.e. the degree of openness) of the second control valve 152. Release of the fluid in the cylinder can minimize the resistance to the rotation of the drive shaft 240 by the cylinder and also can allow for further decompression of the resilient element 260. FIG. 6B is a graphical representation of the fluid pressure in the cylinder unit 200 as a function of driveshaft 240 position for two exemplary drive mode scenarios. The first scenario represents the injection of a relatively smaller volume of fluid and the second scenario represents the injection of a relatively larger volume of fluid. The drive power developed (i.e. imparted to the driveshaft 240) by the cylinder unit is a function of the area under each curve. It can be observed from FIG. 6B that more drive power is developed by the relatively larger injection of fluid compared to the relatively smaller injection of fluid. The control unit 160 can regulate drive power by adjusting the volume of fluid injected into the cylinder unit 110.

In addition to the brake and drive modes of operation, the pump/motor 110 can operate in a neutral mode where no significant net braking nor drive power is generated. Operation in the neutral mode is substantially as described above for the drive mode except that the timing of fluid injection and exhaust are different. Fluid is injected into the cylinder when the main piston 210 is substantially mid-way between the BDC position and the TDC position. Fluid is exhausted when the main piston is substantially mid-way between the TDC and BDC positions.

The pump/motor 110 is reversible and can provide brake, drive and neutral modes of operation when the drive shaft 240 rotates in either one direction or the reverse direction. Operation of the pump/motor 110 in brake, drive and neutral modes and the direction of rotation is controlled by the control unit 160. The control unit 160 can control the first and second control valves 150, 152 as described above. The control unit 160 receives a signal from a position sensor (not illustrated) that provides information about the rotational position of the drive shaft 240. The position sensor can be, for example, a Hall Effect sensor, an electro-optical sensor or another well known shaft position sensing device. From the position of the drive shaft 240 and the relative phase positions of the cylinders, the control unit 160 can derive the reciprocating position of the main piston 210 in each cylinder. From changes in the position of the drive shaft 240, the control unit 160 can derive the direction and speed of rotation of the drive shaft 240. The operating modes (i.e. braking, drive and neutral) and the direction of the pump/motor 110, and the power applied can be controlled by varying the timing and operation of the first and second control valves 150, 152 associated with each cylinder. FIGS. 5A-E are schematic representations of exemplary fluid injection and exhaust timings relative to different modes of operation of the pump/motor 110.

In an alternative embodiment the neutral mode of operation provides for the disengagement of the main piston 210 of each cylinder from the drive shaft 240. Disengagement can be controlled by the control unit 160. By allowing fluid to exhaust from the cylinder while the main piston 210 is traveling toward TDC and by closing both the first 150 and second 152 control valves when the main piston 210 is substantially at the TDC position, the main piston 210 will remain in substantially the TDC position and decouple from the connecting rod 230. The second piston 250 comes to rest on a travel limit mechanism 290 that prevents the second piston 250 from coming in contact with the main piston 210. The second piston 250 in combination with the travel limit mechanism 290 contain any residual potential energy that is stored in the resilient element 260 thereby preventing it from acting on the main piston 210. When the main piston 210 is disengaged from the connecting rod 230, the cylinder provides no substantive braking or drive power to the drive shaft 240. To reengage the main piston 210, fluid is injected into the cylinder as the connecting rod 230 passes through the TDC position and any of the operating modes (braking, drive and neutral) can be applied.

The control unit 160 can control the operation of the components of the regenerative brake system to provide for the accumulation of potential energy during braking of the vehicle, to convert stored potential energy to kinetic energy to drive the vehicle and to minimize parasitic effects when neither braking nor drive of the vehicle is being requested. The control unit 160 can receive input from an operator of the vehicle via interfaces such as, for example, a brake pedal and an accelerator pedal (not illustrated). The control unit 160 can, in interoperation with an antilock brake system (ABS) controller, provide for an ABS function. When the ABS controller determines that ABS intervention is required it can provide the control unit 160 with an intervention signal. In response to the intervention signal the control unit 160 can modulate the braking power being applied by intermittently opening the second control valve 152. Alternatively the braking power can be modulated by the control unit 160 by varying the volume of fluid that is injected into the cylinder units 200 of the pump/motor 110. The intervention signal and the response of the control unit 160 can be modulated multiple times per second in order to provide a fine-grained regulation of the ABS function. Similarly, the control unit 160 can, in interoperation with a traction control system (TCS) controller or vehicle stability control system (VSC) controller, provide for a TCS or VSC function. When the TCS or VSC controller determines that a TCS or VSC intervention is required it can provide the control unit 160 with an intervention signal. In response to the intervention signal the control unit 160 can selectively apply braking power or drive power to one or more of pump/motors 110 associated with each of the vehicle axles. In an alternative embodiment any of the ABS controller, the TCS controller and the VSC controller can be incorporated into the control unit 160.

Figure 7:
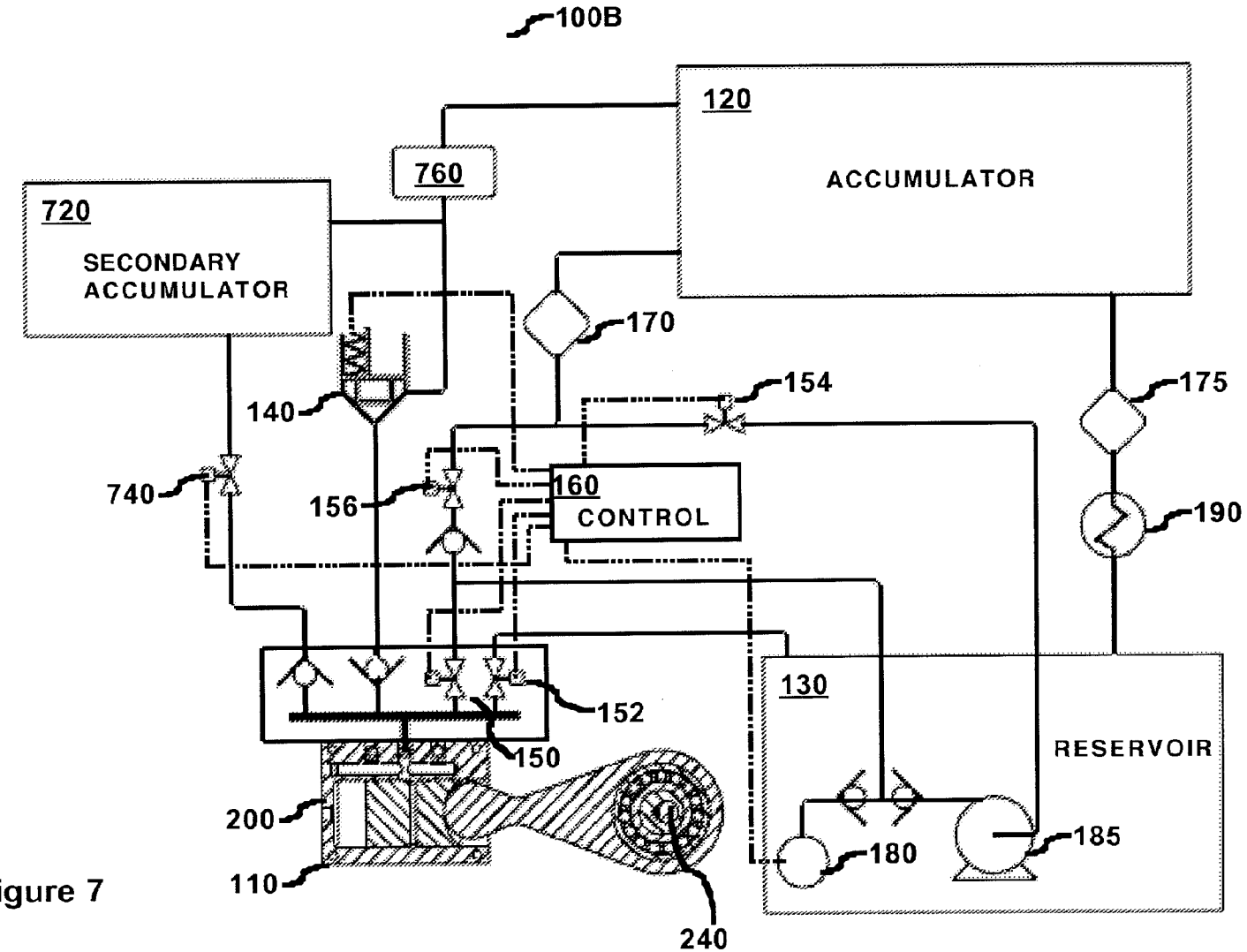
FIG. 7 is a schematic representation of another exemplary embodiment of a regenerative brake system.

FIG. 7 is a schematic representation of another exemplary embodiment of a regenerative brake system 100B in which hydraulic conduits are represented by solid lines and control signal paths are represented by dashed lines. The embodiment of the brake system 100B of FIG. 7 differs in particular from the embodiment of the brake system 100A of FIG. 1 in that brake system 100B provides for a failsafe mode of operation. The components that comprise brake system 100B are the same, and function in the substantially same way, as described above with reference to brake system 100A and FIG. 1 except as otherwise described below. In addition to the accumulator 120 the brake system 100B further comprises a secondary accumulator 720. The secondary accumulator 720 is preferably smaller in capacity than the accumulator 120. The smaller secondary accumulator 720 can be more rapidly charged than the larger accumulator 120 and thereby can reduce a start-up delay in the operation of the brake system 100B when the accumulator 120 contains little or no pressurized fluid. Charging of the secondary accumulator 720 can be achieved by operation of the pump/motor 110 in brake mode. When the pressure in the cylinder reaches or exceeds the input pressure threshold of the proportioning valve 140, fluid exits the cylinder and enters the secondary accumulator 720. When the pressure of the fluid in the secondary accumulator 720 exceeds a pre-determined threshold a pressure sequence valve 760 connected to the fluid conduit between proportioning valve 140 and secondary accumulator 720 opens and allows pressurized fluid to enter the accumulator 120. The secondary accumulator 720 and accumulator 120 are charged sequentially (i.e. the secondary accumulator 720 first followed by the accumulator 120) with pressurized fluid in the course of operation of the brake system 100B when the braking mode is applied. Normally the brake system 100B operates in a restrictive mode when in the brake mode of operation wherein braking power is achieved using relatively small injections of fluid into the pump/motor 110 and operating the proportioning valve 140 so that it remains closed until the input pressure threshold is reached or exceeded. Charging of the secondary accumulator 720 can optionally be accelerated using a volumetric mode wherein the proportioning valve 140 is operated into an open position during braking mode and a larger volume of fluid is injected into the pump/motor 110 than would be the case in restrictive mode. In volumetric mode, the inherent resistance of the fluid conducting devices when passing large volumes of fluid is used to create braking power. The larger volume of injected fluid provides for the secondary accumulator 720 to be recharged more rapidly than would be the case in restrictive mode.

The brake system 100B further comprises a solenoid operated valve 740 and a check valve that are interconnected by fluid conduits to provide a path from the secondary accumulator 720 to the pump/motor 110. The solenoid operated valve 740 is operated into a closed position, preventing fluid passage, in normal operation of the brake system 100B. When control power (i.e. power to the control unit 160) is lost or when a catastrophic operating condition occurs preventing normal operation of the brake system 100B, solenoid operated valve 740 opens and allows the pressurized fluid in the secondary accumulator 720 to be injected into the pump/motor 110 providing for an emergency brake mode of operation. In an embodiment where the pump/motor 110 comprises more than one cylinder unit 200, fluid released by the solenoid operated valve 740 is injected into each of the cylinder units 200. In the emergency brake mode of operation injection of the fluid into the pump/motor 110 is unregulated. Fluid being exhausted from the pump/motor can pass via the proportioning valve 140 to the secondary accumulator 720 when the input pressure threshold of the proportioning valve 140 is reached or exceeded. In the emergency brake mode of operation the input pressure threshold of the proportioning valve 140 can be a pre-determined threshold in the absence of a control signal from the control unit 160. The brake system 100B continues to operate in the emergency brake mode until control power is restored.

It will be apparent to one skilled in the art that numerous modifications and departures from the specific embodiments described herein may be made without departing from the spirit and scope of the present invention.

The invention claimed is:

[1. A regenerative brake system for use in a vehicle having at least one axle comprising:

a variable displacement hydraulic pump/motor, connected for energy transfer to and from the axle;

a hydraulic pressure accumulator for storing and supplying pressurized fluid;

a proportioning valve for allowing pressurized fluid, above a release pressure threshold, generated in the pump/motor to enter the pressure accumulator;

a fluid reservoir for receiving, storing and supplying pressure relieved fluid;

an injection transformer for receiving a first volume of pressurized fluid at a first pressure from the pressure accumulator and supplying a second volume of pressurized fluid at a second pressure to the pump/motor, wherein the injection transformer can draw fluid from the fluid reservoir, the second volume is greater than the first volume and the second pressure is lower than the first pressure;

a priming pump for drawing fluid from the fluid reservoir and supplying pressurized fluid to the pump/motor;

a first control valve for controlling the injection of pressurized fluid from any of the pressure accumulator, the injection transformer and the priming pump into the pump/motor, wherein the displacement of the pump/motor is responsive to the volume of pressurized fluid injected;

a second control valve for controlling the exhaust of pressurized fluid from the pump/motor to the reservoir;

a first pressure relief valve connected to the pressure accumulator for supplying pressurized fluid at a reduced pressure;

a second pressure relief valve connected to the pressure accumulator for relieving excess pressurized fluid in the pressure accumulator to the reservoir;

a third control valve for controlling the flow of pressurized fluid from the accumulator, via the first pressure relief valve, to the injection transformer;

a fourth control valve for controlling the flow of pressurized fluid from the accumulator to the pump/motor via the first pressure relief valve and the first control valve; and a control unit for controlling the operation of the regenerative brake system by controlling the release pressure threshold of the proportioning valve, and the timing and duration of the opening and closing of the first control valve, the second control valve, third control valve and the fourth control valve to achieve operation in each of a brake mode in which kinetic energy of the axle is converted to pressurized fluid exhausted by the pump/motor, a drive mode in which potential energy in pressurized fluid injected into the pump/motor is converted to kinetic energy in the axle, and a neutral mode in which substantially no net energy is transferred between the pump/motor and the axle.]

[2. The regenerative brake system of claim 1, the pump/motor comprising:

a drive shaft operably connected to the axle; and one or more cylinder units each having:

a cylinder bore;

a main piston for reciprocation in the cylinder bore;

a connecting rod for connecting the main piston to the drive shaft;

a second piston for reciprocation in the cylinder bore;

a resilient element for biasing the second piston toward the main piston and a port in the cylinder bore arranged to provide for the injection and exhaust of fluid into and out of a volume defined between the main piston and the second piston in the cylinder bore.]

[3. The regenerative brake system of claim 2, where in the resilient element can be connected to a resilience control unit for varying the resistance of the resilient element responsive to a control signal from the control unit.]

[4. The regenerative brake system of claim 2, the connecting rod and the main piston further comprising a connection mechanism providing for the transfer of power between the connecting rod and the main piston, and for the decoupling of the connecting rod from the main piston responsive to the control unit signaling each of the first control valve and the second control valve to remain closed starting when the main piston is proximate a top dead centre (TDC) position in the cylinder bore.]

[5. The regenerative brake system of claim 1, the control unit further providing for receiving an intervention signal from one of a traction control system (TCS) controller and a vehicle stability control system (VSC) controller, and responsive to the intervention signal varying the power applied in one of the drive mode and the brake mode by varying the duration of the opening and closing of the first control valve and the opening of the second control valve.]

[6. The regenerative brake system of claim 1, the control unit further receiving an intervention signal from a vehicle stability control system (VSC) controller, and responsive to the intervention signal reducing the power applied in the brake mode by one of opening the second control valve and varying the duration of the opening and closing of the first control valve.]

[7. The regenerative brake system of claim 1, the control unit further providing for receiving an intervention signal from an antilock brake system (ABS) controller, and responsive to the intervention signal reducing the power applied in the brake mode by one of opening the second control valve, and varying the duration of the opening and closing of the first control valve.]

[8. The regenerative brake system of claim 1, further comprising:

a secondary accumulator for storing and supplying pressurized fluid;

a pressure sequence valve for directing pressurized fluid generated in the pump/motor, and having flowed through the proportioning valve, to the secondary accumulator until a pre-determined pressure is reached in the secondary accumulator and then directing the pressurized fluid to the accumulator; and a solenoid operated valve that responsive to a control signal from the control unit blocks a flow of pressurized fluid from the secondary accumulator to the pump/motor and in the absence of a control signal from the control unit allows a flow pressurized fluid from the secondary accumulator to the pump/motor;

wherein an emergency brake mode is provided by the secondary accumulator and the solenoid operated valve when the control unit fails to provide a control signal to the solenoid operated valve.]

*9. A piston unit comprising: a cylinder unit having: a cylinder bore; a main piston for reciprocation in the cylinder bore; a bearing mechanism positioned on an underside of the main piston for connecting a connecting rod to the main piston; a second piston for reciprocation in the cylinder bore in conjunction with the main piston, such that the second piston and the main piston are arranged to define a volume between them within the cylinder bore, the volume between a top surface of the main piston opposite the underside and a bottom surface of the second piston; a resilient element for biasing the second piston toward the main piston, the resilient element being a closed container for containing a compressible medium; and a port in the cylinder bore arranged to provide for injection and exhaust of hydraulic fluid into and*

*out of the volume; wherein the injection of the hydraulic fluid into the volume causes compression of the resilient element when both of the pistons move in the cylinder bore toward the resilient element.*

*10. The piston unit of claim 9, wherein the resilient element is connected to a resilience control unit for varying a resistance of the resilient element.*

*11. The piston unit of claim 9, wherein the second piston and the cylinder bore define the resilient element between a top surface of the second piston and the cylinder bore.*

*12. The piston unit of claim 9, wherein movement of the main piston during said reciprocation is relative to the movement of a driveshaft coupled to the connecting rod.*

*13. The piston unit of claim 9, wherein the resilient element contains a compressible medium selected from the group consisting of air and nitrogen.*

*14. The piston unit of claim 9, wherein the bearing mechanism provides for decoupling of the main piston from the connecting rod.*

*15. An apparatus comprising a piston unit having a cylinder unit including: a cylinder defining a bore; first and second pistons for reciprocating in conjunction with one another in said cylinder bore; a port in said cylinder bore, said port being arranged to provide for injection and exhaust of hydraulic fluid into and out of a first volume, said first volume being bounded at least in part by a surface of said first piston; and a resilient element contained in a second volume, said second volume being bounded at least in part by a surface of said second piston, the resilient element being a closed container for containing a compressible medium; wherein the injection of the hydraulic fluid into the first volume causes a reduction in the second volume when both of the pistons move in the cylinder bore toward the resilient element resulting in its compression.*

*16. The apparatus of claim 15, wherein the first piston has a surface configured to engage a connecting rod.*

*17. The apparatus of claim 16, wherein the first surface is configured for engaging a corresponding spherical surface of the connecting rod.*

*18. The apparatus of claim 15, wherein said first volume is further bounded by an additional surface of said second piston.*

*19. The apparatus of claim 15, further comprising a travel limit member for limiting travel of said first piston within said bore.*

*20. The apparatus of claim 15, wherein the compressible medium is selected from the group consisting of air and nitrogen.*

*21. The apparatus of claim 15, further comprising a resistance control element for adjusting an extent of resiliency of the resilient element.*

*22. The apparatus of claim 15, wherein the resilient element, when compressed, exerts a force urging said first piston to move in a direction that decreases said first volume.*

*23. An apparatus comprising a piston unit having a cylinder including: a cylinder defining a bore; first and second pistons for reciprocating in conjunction with one another in said cylinder bore; a port in said cylinder bore, said port being arranged to provide for injection and exhaust of hydraulic fluid into and out of a first volume, said first volume being bounded at least in part by a surface of said first piston; and a resilient element contained in a second volume, said second volume being bounded at least in part by a surface of said second piston, the resilient element being a closed container for containing a compressible medium; wherein the injection of the hydraulic fluid into the first volume causes a reduction in the second volume when both of the pistons move in the same direction in the cylinder bore resulting in the compression of the resilient element.*

*24. The apparatus of claim 23, wherein the compressible medium is selected from the group consisting of air and nitrogen.*

* * * * *